United States Patent [19]
Akazawa et al.

[11] Patent Number: 5,509,972
[45] Date of Patent: Apr. 23, 1996

[54] AIR-CONDITIONER CLEANING METHOD

[76] Inventors: Yasumasa Akazawa, 2-8-14, Higashi Shinmachi, Matsubara Osaka; Taiko Kitai, 2-1423-8 Kami Ishikiricho, Higashi Osaka; Katsuyuki Sasaki, 4-3-2 Amami Minami, Matsubara Osaka; Takeo Karashima, 2-8-24, Kyomachibori, Nishi-ku, Osaka, all of Japan

[21] Appl. No.: 266,956

[22] Filed: Jun. 27, 1994

[51] Int. Cl.⁶ .................................................. B08B 3/00
[52] U.S. Cl. .......................................................... 134/26
[58] Field of Search ........................ 134/22.1, 22.18, 134/22.12, 17, 24, 37, 2, 3, 34, 37, 26, 19, 18, 22.13, 22.14, 22.16, 22.17, 22.19

[56] References Cited

U.S. PATENT DOCUMENTS

| | | | |
|---|---|---|---|
| 2,387,324 | 10/1945 | Glickman | 134/22.1 |
| 2,458,333 | 1/1949 | Brady | 134/22.1 |
| 5,011,537 | 4/1991 | Voegele | 134/22.12 |
| 5,421,900 | 6/1995 | Clontz | 134/14 |

Primary Examiner—Melvyn Andrews
Attorney, Agent, or Firm—Moonray Kojima

[57] ABSTRACT

The invention relates to cleaning method and cleaning apparatus of air-conditioner used in the operation for cleaning and removing the contamination of the heat exchanger (condenser, evaporator) for composing an air-conditioner, for example, one-package type air-conditioner and separate type air-conditioner, and more particularly to an air-conditioner cleaning method and its cleaning apparatus capable of securely cleaning and removing the dirt sticking to the heat exchanger to the deepest parts, by keeping the open side of the spraying guide body in contact with the cleaning parts of the heat exchanger for composing an air-conditioner, connecting detergent feed means to the closed side of the spraying guide body through an injection pipe, spraying the detergent supplied from the detergent feed means to the area enclosed by the spraying guide body, and cleaning and removing the dirt sticking to the heat exchanger by the foamy detergent, while preventing splash-back of the detergent.

8 Claims, 10 Drawing Sheets

AIR-CONDITIONER CLEANING METHOD

SUMMARY OF THE INVENTION

The present invention relates to an air-conditioner cleaning method and its cleaning apparatus for use in contamination cleaning job of heat exchangers (condenser, evaporator) composing the air-conditioner such as one-package type air-conditioner and separate type air-conditioner, and is characterized by cleaning and removing the dirt sticking to the heat exchanger securely to the deepest parts, by keeping the open side of the spray guide body in contact with the cleaning parts of the heat exchanger composing the air-conditioner, connecting detergent feed means to the closed side of the spray guide body through an injection pipe, spraying the detergent supplied from the detergent feed means to the area enclosed by the spray guide body, and cleaning and removing the dirt sticking to the heat exchanger by foamy detergent, while preventing splash-back of the detergent.

BACKGROUND OF THE INVENTION

Hitherto, as the method of cleaning the heat exchanger incorporated in an indoor unit of a separate type air-conditioner, for example, after removing the filter and cover of the indoor unit, detergent is sprayed to the pipes and fins of the heat exchanger (evaporator) incorporated in the indoor unit, and the dirt sticking to the pipes and fins is cleaned and removed by the detergent.

At the time of, however, cleaning and removing the dirt sticking to the pipes and fins of heat exchanger in such manner as stated above, when the detergent is sprayed orthogonally to the cooling surface of the pipes and fins laid at the front side of the heat exchanger, part of the detergent is splashed back by the pipes and fins. When the detergent is blown by force to the pipes and fins, the outer surface of the indoor unit or the surrounding may be contaminated by the drift of the detergent, and it is difficult to clean and remove the stubborn dirt sticking to the pipes and fins.

Besides, since the pipes of the heat exchanger are arranged by staggering vertically or laterally, the spray of the detergent is disturbed by the pipes and fins arranged at the front side, and it is hard to blow the detergent directly to the pipes and fins arranged at the rear side. Besides, it was also hard to observe the state of contamination of the pipes and fins arranged at the rear side from the front side, and it took time and labor to clean the entire heat exchanger.

OBJECTS OF THE INVENTION

It is hence a primary object of the invention to present an air-conditioner cleaning method capable of cleaning the entire heat exchanger neatly, by keeping a spraying guide body in contact with the cleaning parts of a heat exchanger for composing an air-conditioner, spraying detergent or cleaning water to the parts enclosed by the spraying guide body, thereby preventing splash-back of detergent or cleaning water, and cleaning and removing the dirt sticking to the heat exchanger to the deepest parts.

It is other object of the invention to present an air-conditioner cleaning method capable of spraying detergent or cleaning water easily, by keeping a see-through spraying guide body in contact with the cleaning parts of a heat exchanger, and spraying detergent or cleaning water while observing the cleaning parts of the heat exchanger through the spraying guide body.

It is another object of the invention to present an air-conditioner cleaning method capable of spraying detergent or cleaning water uniformly to cleaning parts of a heat exchanger, by distributing the detergent or cleaning water into passages of the spraying guide body, and dispersing and discharging the detergent or cleaning water from the open end of each passage.

It is a different object of the invention to present an air-conditioner cleaning method capable of spraying detergent or cleaning water uniformly to cleaning parts of a heat exchanger, by discharging detergent or cleaning water from an injection pipe inserted into a pipe insertion hole of a spraying guide body, thereby preventing splash-back of the detergent by the spraying guide body.

It is other different object of the invention to present an air-conditioner cleaning apparatus capable of easily cleaning and removing the dirt sticking to a heat exchanger, by keeping the open side of a spraying guide body in contact with the cleaning parts of the heat exchanger for composing an air-conditioner, discharging the detergent supplied from detergent feed means through an injection pipe inserted into the spraying guide body, and concentrating and blowing the detergent on the parts of the dirt sticking to the heat exchanger.

It is a further different object of the invention to present an air-conditioner cleaning apparatus capable of easily cleaning and removing the dirt sticking to a heat exchanger, by manipulating to move in and out an injection pipe inserted into the closed side of a spraying guide body, inserting the injection pipe deeply into the inside of the heat exchanger, or bringing the injection pipe close to the cleaning parts of the heat exchanger, and concentrating and blowing the detergent supplied from detergent feed means on the parts of the dirt sticking to the heat exchanger.

Other objects of the invention will be easily understood and appreciated from the following detailed description of the embodiments.

EMBODIMENTS

Referring now to the drawings, an embodiment of the invention is described in detail below.

Figure 1:
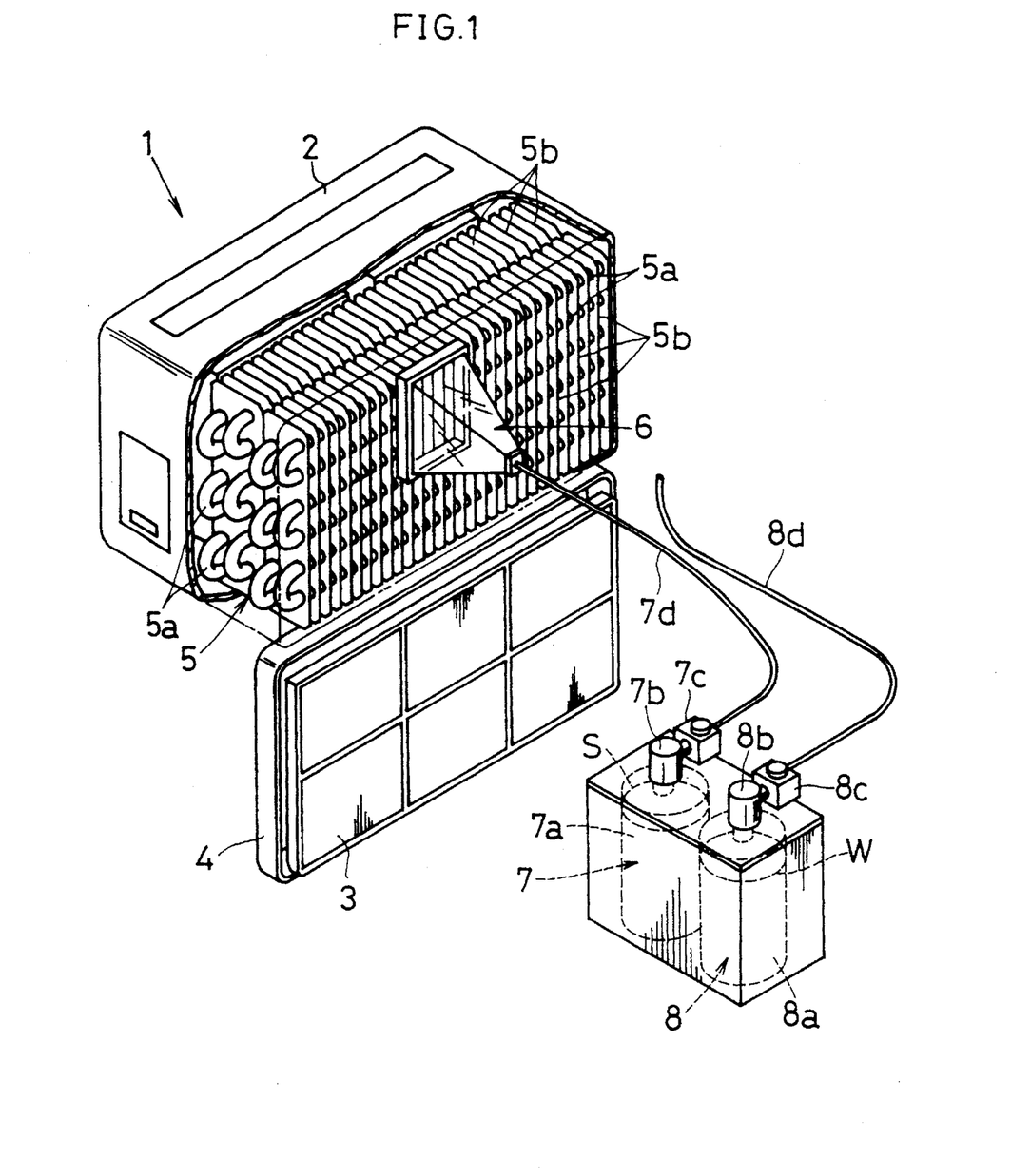
FIG. 1 is a perspective view showing a cleaning method of a separate type air-conditioner of the invention.
Figure 2:
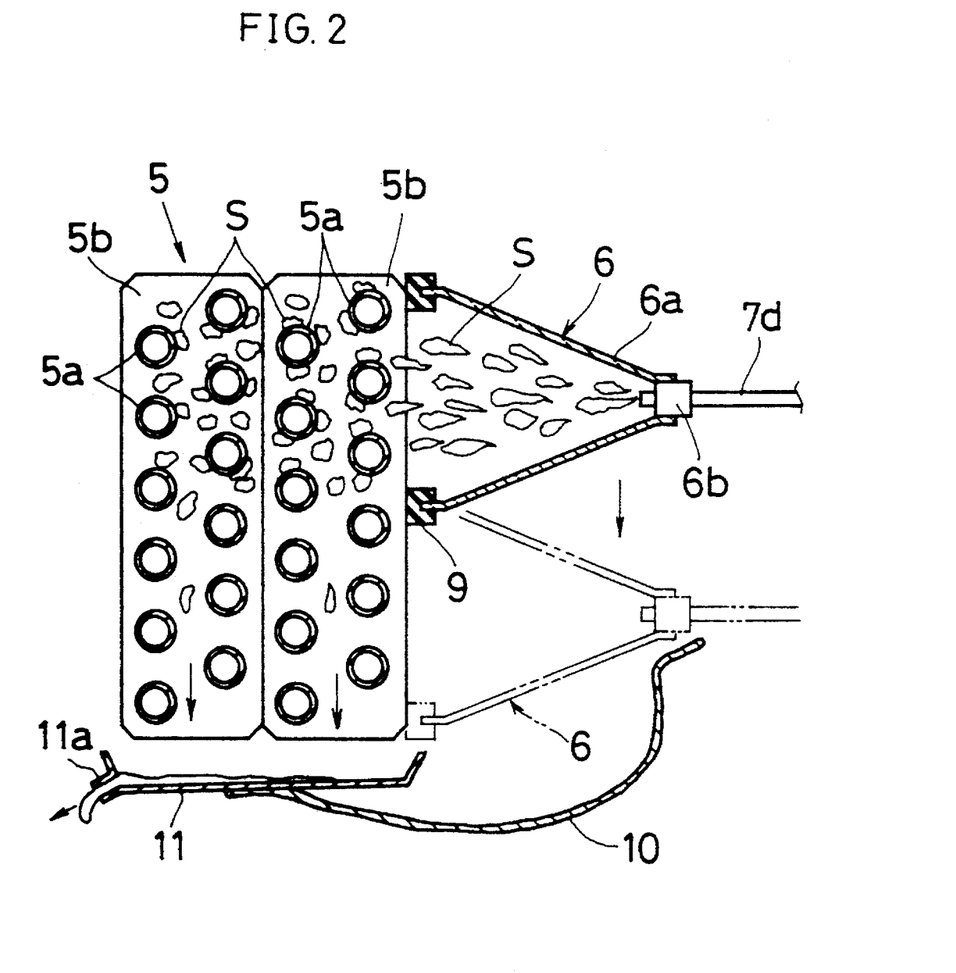
FIG. 2 is a longitudinal sectional view showing a spraying state of detergent.
Figure 3:
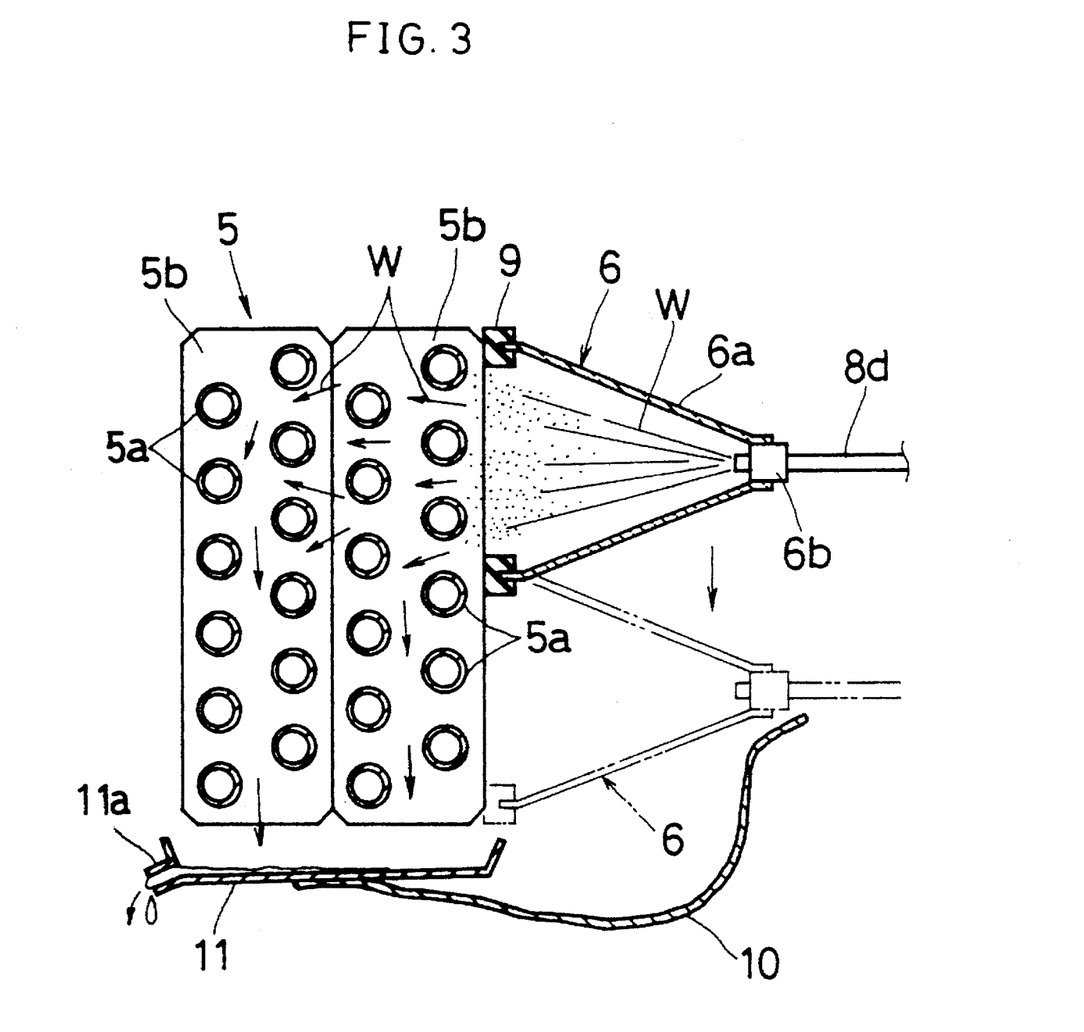
FIG. 3 is a longitudinal sectional view showing a spraying state of cleaning water.

The drawings show an air-conditioner cleaning method and its cleaning apparatus for cleaning a heat exchanger built in an indoor unit of a separate type air-conditioner as an example of air-conditioner, and in FIGS. 1, 2, and 3, the air-conditioner cleaning apparatus in a first embodiment is shown, in which a filter 3 and a cover 4 of an indoor unit 2 for composing a separate type air-conditioner 1 are detached, and a spraying guide body 6 of taper cone shape is fitted tightly to the front side of a heat exchanger 5 built in the indoor unit 2. Detergent S loaded in a first filling container 7 is sprayed to the area enclosed by the spraying guide body 6, and the dirt sticking to pipes 5a and fins 5b of the heat exchanger 5 are cleaning and removed by the foamy detergent S. Afterwards, cleaning water W loaded in a second filling container 8 is sprayed to the area enclosed by the spraying guide body 6, and the dirt and dirty liquid remaining on the pipes 5a and fins 5b of the heat exchanger are cleaned and removed by the cleaning water W.

The spraying guide body 6 forms a guide main body 6a in a shape of circular cone or pyramid by transparent or translucent synthetic resin material, and a pipe insertion part 6b for inserting injection pipes 7d, 8d mentioned later are formed at an acute angle base end of the guide main body 6a, and a seal packing 9 of synthetic rubber is fitted and fixed to the open side peripheral edge of the guide main body 6a.

The first filling container 7 is a hollow metal container main body 7a, which is filled with detergent S blending proper amounts of water, phosphoric acid, Softanol 70, propylene glycol monomethyl ether (MFG), and others, and the injection pipe 7d is connected to a discharge port 7b of the container main body 7a through a valve 7c, and by the push-down manipulation of the valve 7c, the detergent S loaded in the container main body 7a is discharged in a fine foam from the injection pipe 7d by transfer pressure of sealing gas or feed pump (not shown).

The second filling container 8 is a hollow metal container main body 8a, which is filled with cleaning water W such as tap water and distilled water, and the injection pipe 8d is connected to a discharge port 8b of the container main body 8a through a valve 8c, and by the push-down manipulation of the valve 8c, the cleaning water W loaded in the container main body 8a is discharged from the injection pipe 8d by transfer pressure of sealing gas or feed pump. The cleaning water W loaded in the container main body 8, meanwhile, contains a proper amount of chemical Y, such as preservative and antibacterial agent.

In thus constituted embodiment, below is explained the cleaning method of the heat exchanger 5 built in the indoor unit 2 of the separate type air-conditioner 1.

First, as shown in FIGS. 1 and 2, the filter 3 and cover 4 of the indoor unit 2 for composing the separate type air-conditioner 1 are detached, and a water-absorbing protective cover 10 is fitted to the lower part of the front side of the indoor unit 2 through a flat fastener (Velcro tape), then the open side edge of the spraying guide body 6 is tightly fitted to the front side of the heat exchanger 5 built in the indoor unit 2.

Next, the injection pipe 7d connected to the first filling container 7 is inserted into the pipe insertion part 6b of the spraying guide body 6, and the valve 7 is opened to discharge continuously the detergent S loaded in the first filling container 7 from the front end of the injection pipe 7d. By spraying the fine foamy detergent S discharged from the injection pipe 7d toward the pipes 5a and fins 5b of the heat exchanger 5, splash-back of the detergent S is blocked by the spraying guide body 6, while the foamy detergent S invades easily into the deeper parts of the fins 5b, so that the dirt sticking to the pipes 5a and fins 5b is securely cleaned and removed by the detergent S. In addition, since the detergent is sprayed while observing the cleaning parts from the front side through the see-through spraying guide body 6, the detergent S can be accurately sprayed to the contaminated area, so that the cleaning job is easy.

Figure 4:
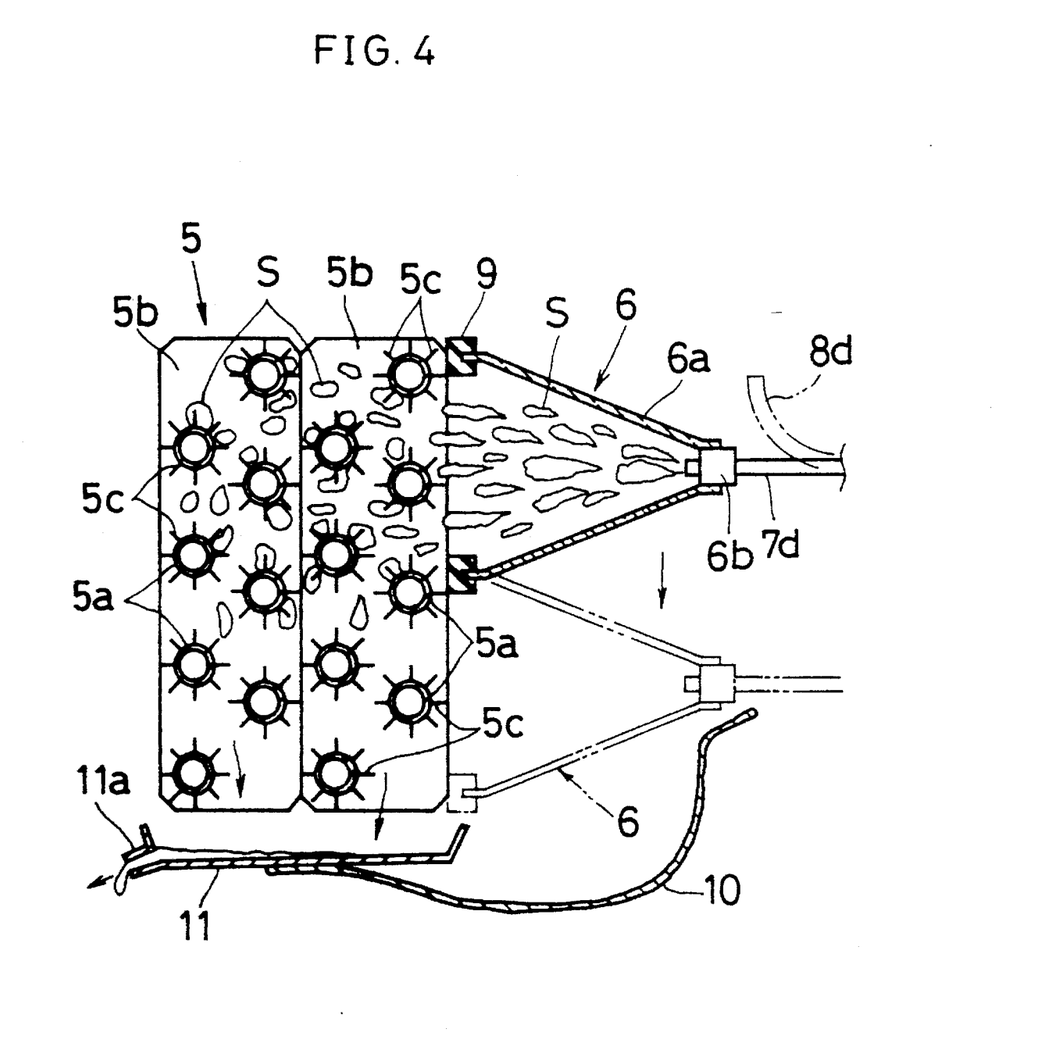
FIG. 4 is a longitudinal sectional view showing a cleaning method of a heat exchanger having a different constitution of the invention.

Or, as shown in FIG. 4, if a multiplicity of fins 5c . . . are formed on the outer circumference of the pipes 5a for composing the heat exchanger 5, the foamy detergent S discharged from the injection pipe 7d of the first filling container 7 invades among the fins 5c, and the dirt sticking among the fins 5c can be securely cleaned and removed by the detergent S.

At the same time, the used detergent S flows down along the pipes 5a and fins 5b of the heat exchanger 5, and the used detergent S drops into a tray 11 disposed beneath the heat exchanger 5. The used detergent S is discharged from a drain hole 11a formed in the tray 11, while the liquid leak occurring at the time of cleaning is recovered from time to time by the water absorbing action of the protective cover 10, and therefore the used detergent S does not deposit on the outside and periphery of the indoor unit 2, so that the entire heat exchanger 5 can be cleaned neatly. Still more, by moving the spraying guide body 6 vertically and laterally, the dirty deposits on the right side, middle and left side of the heat exchanger 5 are cleaned and removed by the detergent S.

In consequence, as shown in FIG. 3, the injection pipe 7d of the first filling container 7 is extracted from the pipe insertion part 6b of the spraying guide body 6, and the injection pipe 8d of the second filling container 8 is inserted into the pipe insertion part 6b of the spraying guide body 6, and the valve 8c is opened to discharge cleaning water W loaded in the second filling container 8 from the injection pipe 8d, and the dirt and dirty liquid remaining in the pipes 5a and fins 5b of the heat exchanger 5 are cleaned and removed by the cleaning water W, so that the splash-back of the cleaning water W is blocked by the spraying guide body 6, and therefore the dirt and dirty liquid do not deposit on the outside or periphery of the indoor unit 2, thereby cleaning the entire heat exchanger 5 neatly. Moreover, the pipes 5a and fins 5b of the heat exchanger are sterilized and treated by the chemical Y such as preservative and antibacterial agent mixed in the cleaning water W.

Otherwise, a long sealing packing 9 is tightly fitted along the longitudinal front part of the heat exchanger 5, and upper and lower edges of the spraying guide body 6 are stopped to the sealing packing 9, and moved horizontally in the lateral direction, and the detergent S or cleaning water W may be sprayed to the pipes 5a and fins 5b of the heat exchanger.

In this way, the spraying guide body 6 is tightly fitted to the cleaning parts of the heat exchanger 5 built in the indoor unit 2, and the detergent S loaded in the first filling container 7 or the cleaning water W loaded in the second filling container 8 is sprayed to the area enclosed by the spraying guide body 6, and therefore if the detergent S or cleaning water W is orthogonally sprayed to the cleaning parts of the heat exchanger 5 as in the prior art, splash-back of the detergent S or cleaning water W is securely blocked by the spraying guide body 6, thereby preventing the detergent S or cleaning water S from splashing about the outside or periphery of the indoor unit 2, or the dirt or dirty liquid from scattering about.

Still more, since the foamy detergent S easily invades into deep parts of the heat exchanger 5, the dirt sticking to the heat exchanger 5 is securely cleaned and removed, and the entire heat exchanger 5 can be cleaned neatly. Besides, through the see-through spraying guide body 6, the cleaning parts of the heat exchanger 5 can be observed, and the detergent W or cleaning water can be accurately aimed at the dirty spot, so that checking of cleaning state and job of cleaning can be done easily.

Figure 5:
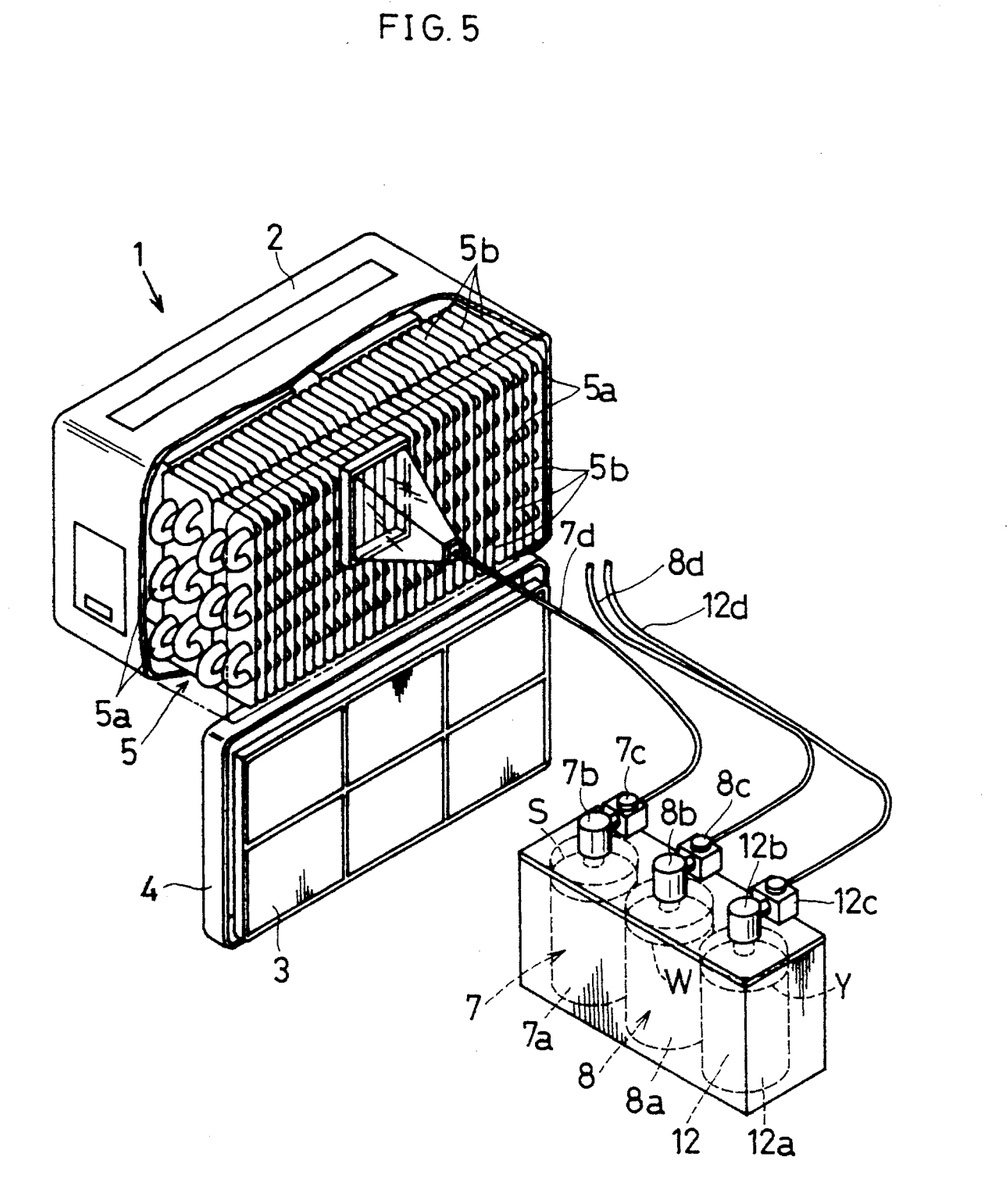
FIG. 5 is a perspective view showing a second embodiment of cleaning method of the invention.

FIG. 5 shows a cleaning method in a second embodiment for cleaning and treating the heat exchanger 5 by detergent S and cleaning water W, and then sterilizing and treating the heat exchanger 5 by the chemical Y such as preservative and antibacterial agent loaded in a third filling container 12, in which the third filling container 12 contains the chemical Y such as preservative and antibacterial agent in a container main body 12a, and an injection pipe 12d is connected to a discharge port 12b of the container main body 12b through a valve 12c. That is, after tightly fitting the spraying guide 6 to the heat exchanger 5, the injection pipe 7d of the first filling container 7 of the injection pipe 8d of the second filling container 8 is inserted into the pipe insertion pipe 6b of the spraying guide body 6, and the detergent S loaded in the first filling container 7 or the cleaning water W loaded in the second filling container 8 is sprayed to the heat exchanger to clean. Afterwards, the injection pipe 12d of the third filling container 12 is inserted into the pipe insertion part 6b of the spraying guide body 6, and the chemical Y such as preservative and antibacterial agent loaded in the third filling container 12 is sprayed to the heat exchanger 5 to sterilize, so that the cleaning process and sterilizing process of the entire heat exchanger 5 can be done easily, same as in the first embodiment.

Figure 6:
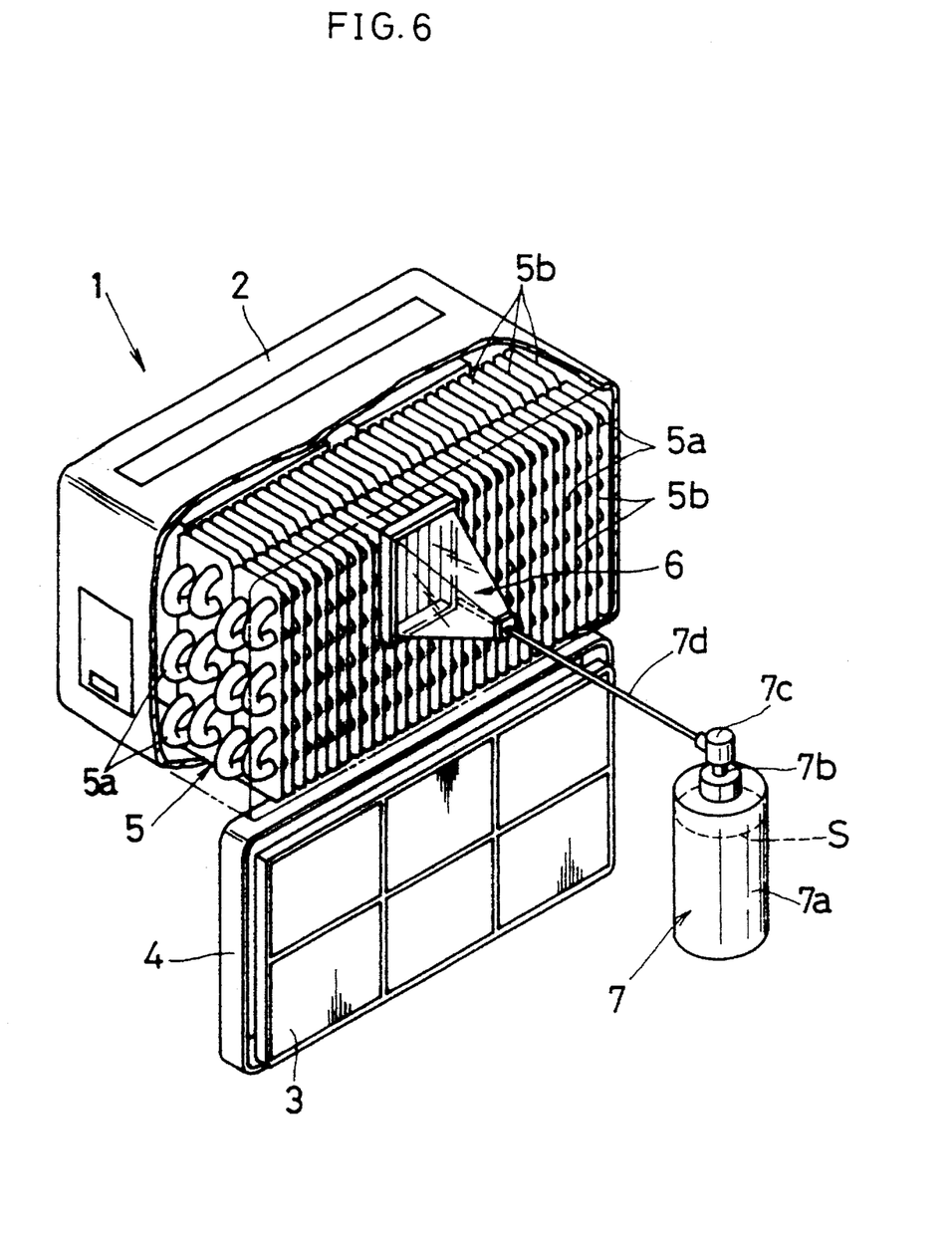
FIG. 6 is a perspective view showing a third embodiment of cleaning method of the invention.

FIG. 6 shows a cleaning method in a third embodiment of cleaning the heat exchanger 5 by the detergent S loaded in the first filling container 7, in which the injection pipe 7d of the first filling container 7 is inserted and connected into the pipe insertion part 6b of the spraying guide body 6 so as to be free to move in and out, the spraying guide body 6 is tightly fitted to the heat exchanger 5, and the injection pipe 5d of the first filling container 7 inserted into the pipe insertion part 6b of the spraying guide body 6 is manipulated to move in and out, and the injection pipe 7d is inserted deeply into the heat exchanger 5 or the injection pipe 7d is brought close to the pipes 5a and fins 5b of the heat exchanger 5, and the detergent S loaded in the first filling container 7 is concentrated and sprayed onto the dirty spot of the heat exchanger 5, so that the dirt sticking to the heat exchanger 5 can be securely cleaned and removed by the detergent S, same as in the first embodiment.

Similarly, the injection pipe 8d of the second filling container 8 of the injection pipe 12d of the third filling container 12 is inserted into the pipe insertion part 6b of the spraying guide body 6, and the dirt and dirty liquid remaining in the heat exchanger 5 are cleaned by cleaning water W, and the entire heat exchanger 5 can be sterilized by the chemical Y, so that the entire heat exchanger 5 can be easily cleaned and sterilized.

Figure 7:
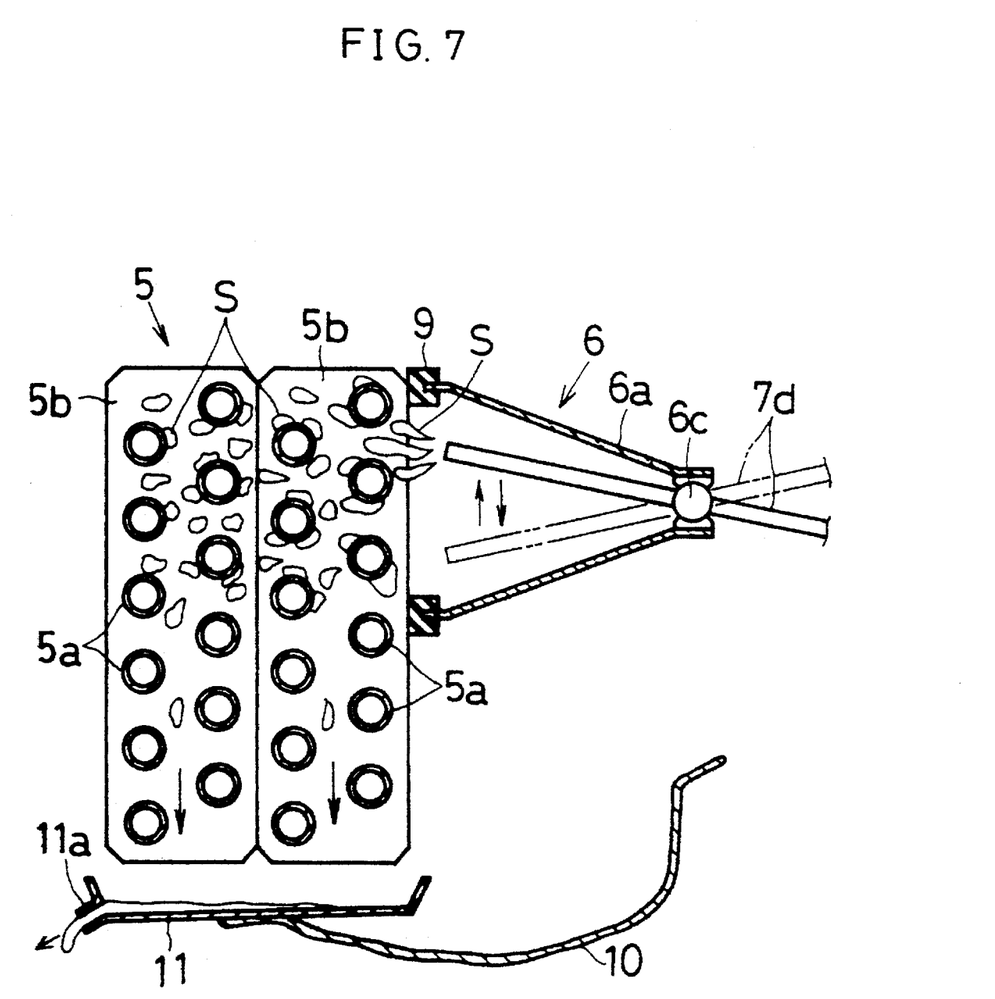
FIG. 7 is a longitudinal sectional view showing a spraying guide body of the invention.

FIG. 7 shows a spraying guide body 6 in a fourth embodiment used in cleaning and removing the dirt sticking to a part of the heat exchanger 5, in which when cleaning and removing the stubborn dirt sticking to the heat exchanger 5, the spraying guide body 6 is tightly fitted to the front side of the heat exchanger 5 incorporated in the indoor unit 2, the injection pipe 7d of the first filling container 7 is retractably inserted into a flexible pipe joint 6c formed in the acute angle side front part of the spraying guide body 6, the injection pipe 7d is rotated and manipulated in the discharge angle and discharge direction confronting the dirt sticking to the heat exchanger 5, or the injection pipe 7d is brought close to the dirty spot of the heat exchanger 5, and the foamy or liquid detergent S is concentrated and sprayed on the dirty spot, so that the stubborn dirt sticking to a part of the heat exchanger 5 can be securely cleaned and removed.

In addition, by inserting the injection pipe 8d of the second filling container 8 into the flexible pipe joint 6c of the spraying guide body 6, and rotating and manipulating the injection pipe 8d in the direction confronting the dirt and dirty liquid remaining in the heat exchanger 5, the dirt and dirty liquid remaining in the heat exchanger 5 can be securely washed away by the cleaning water W same as mentioned above.

Figure 8:
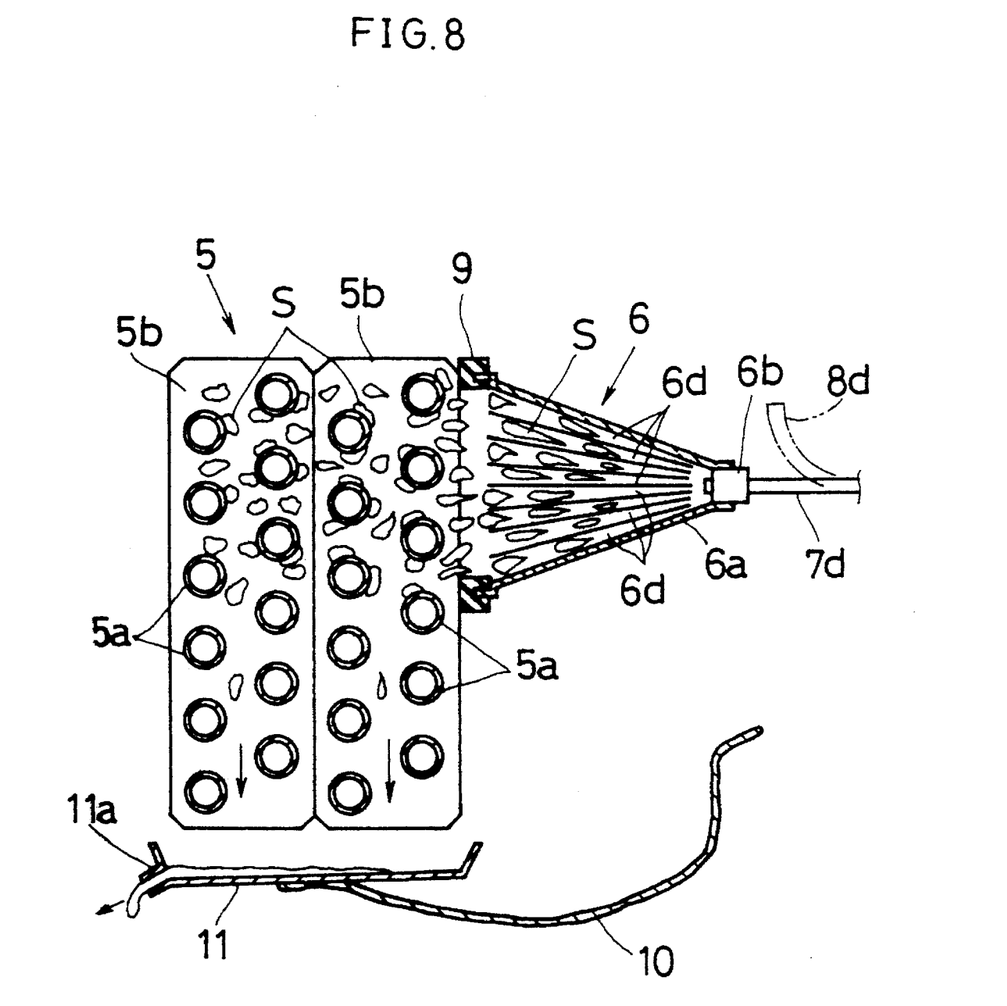
FIG. 8 is a longitudinal sectional view showing other embodiment of spraying guide body of the invention.

FIG. 8 shows a spraying guide body 6 in a fifth embodiment used in uniform spraying of detergent W or cleaning water W to the cleaning parts of the heat exchanger 5, in which a multiplicity of passages 6d . . . are formed radially in the spraying direction in the guide main body 6a for composing the spraying guide body 6, and the injection pipe 7d of the first filling container 7 is inserted and connected into the pipe insertion part 6b of the guide main body 6a. That is, after fitting tightly the spraying guide body 6 to the front side of the heat exchanger 5, the injection pipe 7d of the first filling container 7 is inserted into the pipe insertion part 6b of the spraying guide body 6, and the detergent S loaded in the first filling container 7 is uniformly supplied into the passages 6d . . . in the spraying guide body 6, so that the foamy detergent S is uniformly discharged from the passages 6d . . . of the spraying guide body 6, thereby spraying the detergent S uniformly into the cleaning parts of the heat exchanger 5. Besides, by inserting and connecting the injection pipe 8d of the second filling container 8 into the pipe insertion part 6b of the spraying guide 6, the cleaning water W can be uniformly sprayed to the cleaning parts of the heat exchanger 5.

Figure 9:
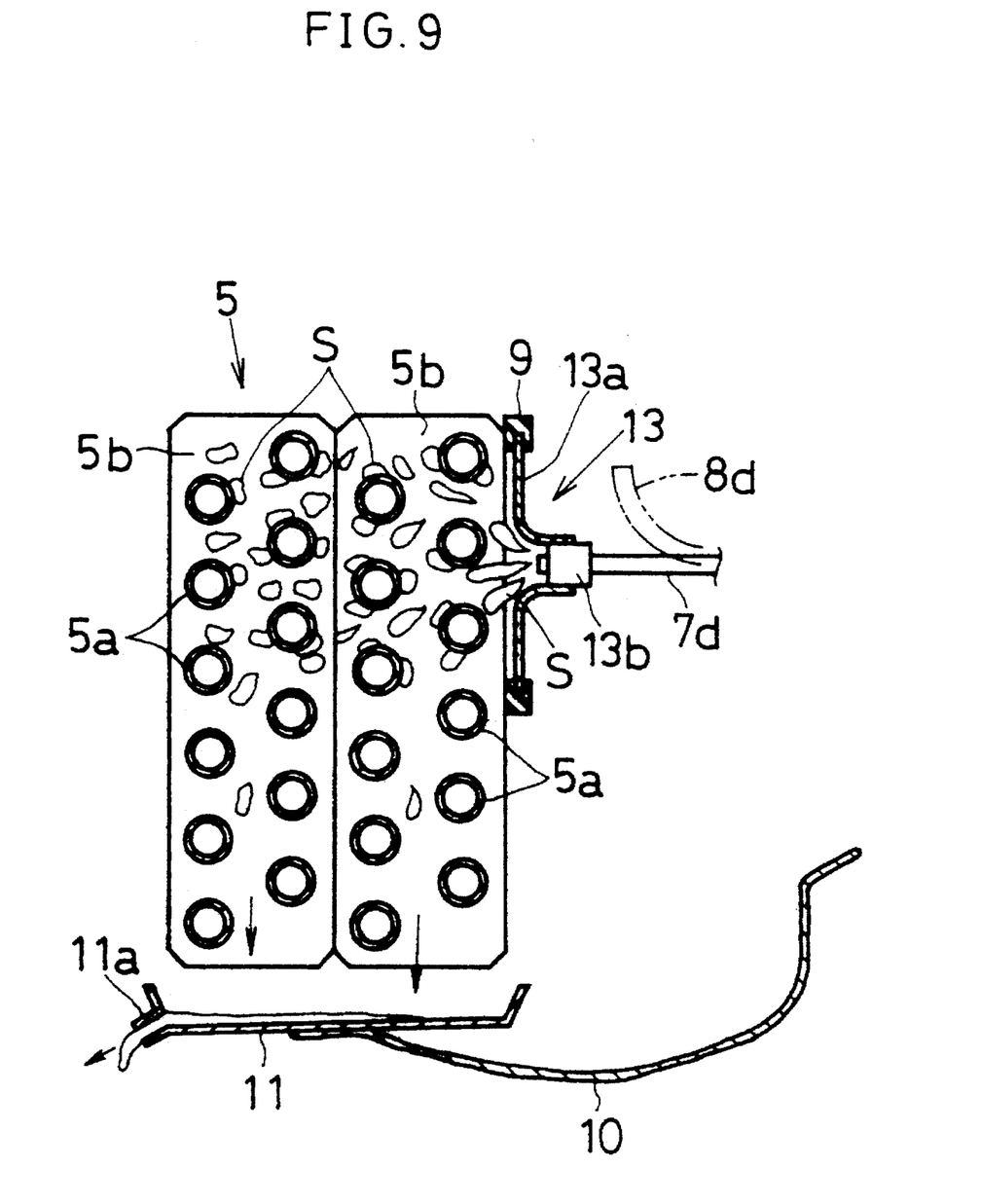
FIG. 9 is a longitudinal sectional view showing another embodiment of spraying guide body of the invention.

FIG. 9 shows a spraying guide body 13 in a sixth embodiment used in partially preventing splash-back of the detergent W and cleaning water W sprayed to the heat exchanger 5, in which a shielding plate 13a of a plane shape is formed of a transparent or translucent synthetic resin material, and a pipe insertion part 13b is formed in the central part of the plane side of the shielding plate 13. That is, after fitting the spraying guide body 13 tightly to the heat exchanger 5, the injection pipe 7d of the first filling container 7 or the injection pipe 8d of the second filling container 8 is inserted into the pipe insertion part 13b of the spraying guide body 13, and the detergent S loaded in the first filling container 7 or the cleaning water W loaded in the second filling container 8 is discharged toward the heat exchanger 5, and therefore, same as in the first embodiment, splash-back of the detergent S or cleaning water W is partly blocked by the spraying guide body 13, thereby securely preventing the detergent S or cleaning water W from splashing on the outside or periphery of the indoor unit 2, or the dirt or dirty liquid from scattering about.

Figure 10:
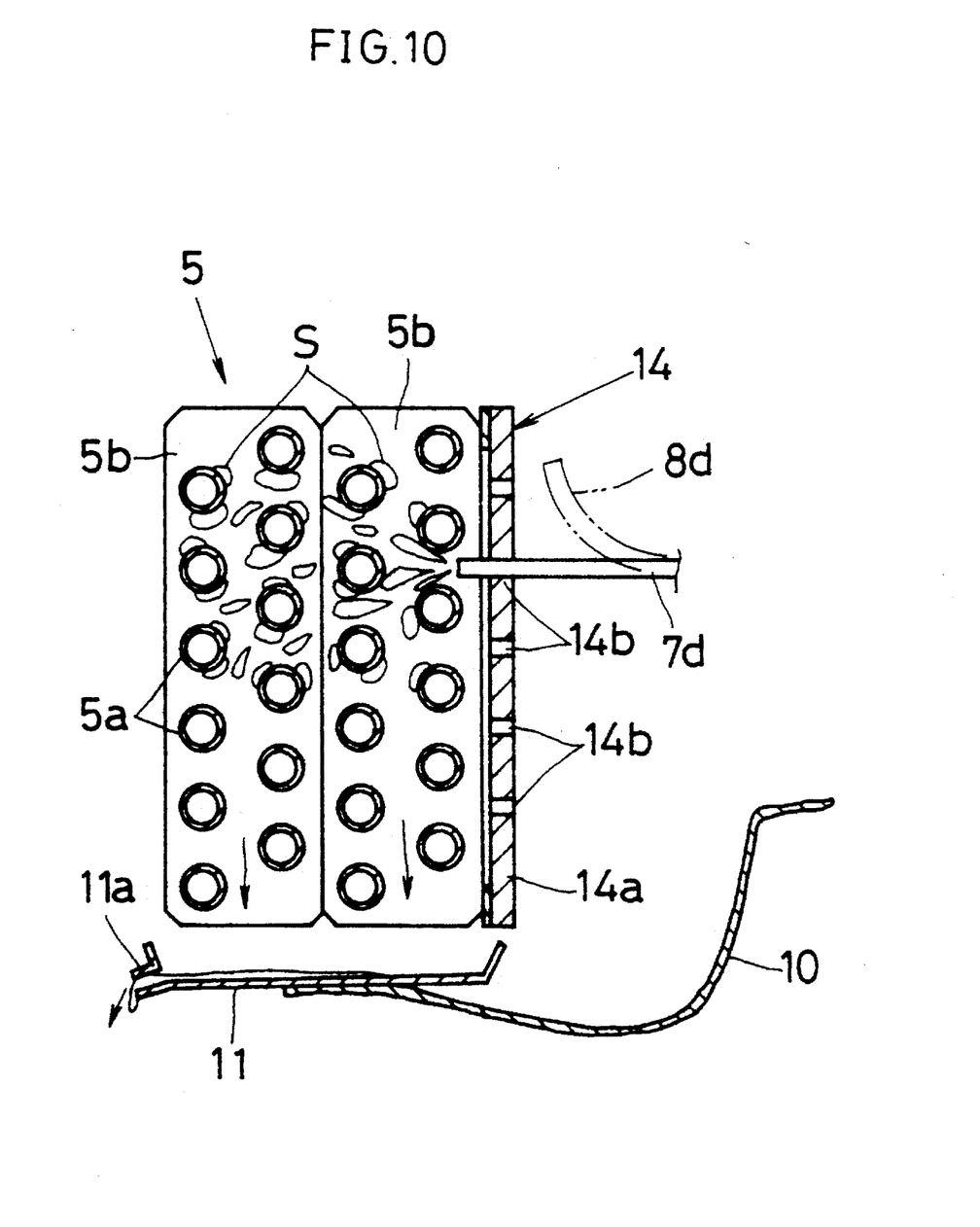
FIG. 10 is a longitudinal sectional view showing a different embodiment of spraying guide body of the invention.

FIG. 10 shows a spraying guide body 14 in a seventh embodiment used in overall prevention of splash-back of detergent S or cleaning water W spraying to the heat exchanger 5, in which a shielding cover 14a is formed of a proper material, such as synthetic rubber, synthetic resin and metal, in a size and shape so that the front side of the heat exchanger 5 may be entirely covered, and plural pipe insertion holes 14b . . . are formed at proper intervals at appropriate positions of the shielding cover 14a. That is, after covering the entire front side of the heat exchanger 5, the injection pipe 7d of the first filling container 7 or the injection pipe 8d of the second filling container 8 is inserted into the pipe insertion holes 14b . . . at proper positions formed in the spraying guide body 14, and the detergent S loaded in the first filling container 7 or the cleaning water W loaded in the second filling container 8 is discharged toward the heat exchanger 5, and therefore, same as in the first embodiment, splash-back of the detergent S and cleaning water S can be totally blocked by the spraying guide body 14, thereby securely preventing the detergent S or cleaning water W from splashing to the outside or periphery of the indoor unit 2, or the dirt and dirty liquid from scattering about.

In contrast between the constitution of the invention and the foregoing embodiments, The air-conditioner in the invention corresponds to the separate type air-conditioner 1 in the embodiment, Similarly thereafter, The cleaning liquid, to the detergent S, cleaning water W, and chemical Y, The detergent feed means, to the first filling container and container main body 7a, discharge port 7b, valve 7c, and injection pipe 7d, The cleaning water feed means, to the second filling container 8 and container main body 8a, discharge port 8b, valve 8c, and injection pipe 8d, and The cleaning liquid feed means, to the first filling container 7 and container main body 7a, discharge port 7b, valve 7c, injection pipe 7d, and second filing container 8, container main body 8a, discharge port 8b, valve 8c, and injection pipe 8d, but The invention is not limited to the embodiments of the above constitutions alone.

In the first embodiment, when spraying either one of the detergent S or cleaning water W to the heat exchanger 5, the injection pipe 7d of the first filling container 7 and the injection pipe 8d of the second filling container 8 inserted into the pipe insertion part 6b of the spraying guide body 6 are exchanged, but for example, by connecting the injection pipes 7d, 8d preliminarily by assembling into one into the pipe insertion part 6b of the spraying guide body 6, and selectively spraying the detergent S or cleaning water W by the opening and closing manipulation of the valves 7c, 8c, it is possible to save time and labor for exchanging the injection pipes 7d, 8d in cleaning operation.

In the foregoing embodiments, meanwhile, the method of cleaning the heat exchanger 5 built in the indoor unit 2 of the separate type air-conditioner 1 is described, but the invention may e also applied in cleaning of the heat exchanger 5 built in, for example, an outdoor unit (not shown).

The cleaning method of the invention may be also applied in cleaning job of the heat exchanger 5 built in a window-mount air-conditioner (not shown), and the applications are not limited to the cleaning operation of the air-conditioners shown in the embodiments alone.

What is claimed is:

1. A method of cleaning cooling fins and pipes of an air-conditioner, said cooling fins and pipes forming an open surface to atmosphere, said method comprising the steps of tightly fitting a liquid proof shield against said open surface and enclosing an area of said cooling fins and pipes so as to prevent fluids from splashing outside of said area;

applying a detergent through said shield and against selected parts of said area with sufficient force and volume to penetrate selected parts of said cooling fins and pipes in said area without any splashing of said detergent outside of said area; and thereafter applying a rinsing fluid through said shield and against said selected parts of said area with sufficient force and volume to rinse off said detergent from said selected parts of said cooling fins and pipes in said selected parts of said area and without any splashing of said rinsing fluid outside of said area.

2. The method of claim 1, wherein said detergent is applied to cover the entire open area enclosed by said shield.

3. The method of claim 2, wherein said detergent is foaming detergent and said rinsing fluid is water.

4. The method of claim 1, wherein said shield is transparent, and wherein further comprising the step of observing through said transparent shield said detergent and said rinsing fluid.

5. The method of claim 1, wherein said detergent is applied through said shield in a plurality of streams.

6. The method of claim 1, therein said rinsing fluid is applied through said shield in plurality of streams.

7. The method of claim 1, wherein said shield is of flat planar structure, and said detergent and said rinsing fluid are applied through said shield at a plurality of different locations.

8. The method of claim 1, wherein said shield is of conical structure with a larger dimension base thereof being tightly fitted to said open surface, and a smaller dimension top thereof forming an opening through which said detergent and said rinsing fluid are applied.

\* \* \* \* \*